(12) United States Patent
Takayama et al.

(10) Patent No.: US 11,005,333 B2
(45) Date of Patent: May 11, 2021

(54) ELECTRIC MOTOR HAVING A STATOR WITH A RADIALLY OUTSIDE ROTOR WITH THE ROTOR HAVING A FAN MOUNTING PORTION COMPRISING A NONCONTACT REGION AND A CONTRACT REGION CONFIGURED TO CONTACT A MOUTING SURFACE OF A FAN

(71) Applicant: DAIKIN INDUSTRIES, LTD., Osaka (JP)

(72) Inventors: Yoshinori Takayama, Kusatsu (JP); Junji Tsukida, Kusatsu (JP)

(73) Assignee: Daikin Industries, Ltd., Osaka (JP)

( * ) Notice: Subject to any disclaimer, the term of this patent is extended or adjusted under 35 U.S.C. 154(b) by 0 days.

(21) Appl. No.: 15/753,257

(22) PCT Filed: Oct. 3, 2016

(86) PCT No.: PCT/JP2016/079275
§ 371 (c)(1),
(2) Date: Feb. 16, 2018

(87) PCT Pub. No.: WO2017/065031
PCT Pub. Date: Apr. 20, 2017

(65) Prior Publication Data
US 2018/0241278 A1    Aug. 23, 2018

(30) Foreign Application Priority Data

Oct. 15, 2015    (JP) .............................. JP2015-203400

(51) Int. Cl.
*H02K 5/24*        (2006.01)
*F04D 29/62*       (2006.01)
(Continued)

(52) U.S. Cl.
CPC ............. *H02K 5/24* (2013.01); *F04D 29/626* (2013.01); *F04D 17/16* (2013.01); *F05B 2260/96* (2013.01); *H02K 7/14* (2013.01)

(58) Field of Classification Search
CPC .... F04D 17/16; F04D 29/626; F04D 25/0613; F04D 29/329; F04D 25/082;
(Continued)

(56) References Cited

U.S. PATENT DOCUMENTS 4,682,065 A * 7/1987 English ................... F16C 35/04
310/156.26
4,934,041 A * 6/1990 Hoover .................. H02K 29/08
29/596

(Continued)

FOREIGN PATENT DOCUMENTS

CN    101529695 A    9/2009
JP    55-46848 A     4/1980
(Continued)

OTHER PUBLICATIONS

International Search Report of corresponding PCT Application No. PCT/JP2016/079275 dated Nov. 8, 2016.
(Continued)

*Primary Examiner* — Patrick Hamo
*Assistant Examiner* — Benjamin Doyle
(74) *Attorney, Agent, or Firm* — Global IP Counselors, LLP

(57) ABSTRACT

An electric motor includes a stator, a rotor having a tubular shape and disposed radially outside of the stator, and a fan mounting portion located on one side of the stator along an axial direction and mounted to the rotor. An end face of the fan mounting portion has a contact region that contacts a mounting surface of a fan, and a noncontact region that does not contact the fan.

15 Claims, 6 Drawing Sheets

(51) Int. Cl.
*H02K 7/14* (2006.01)
*F04D 17/16* (2006.01)

(58) Field of Classification Search
CPC .... F04D 29/083; F04D 29/646; F04D 19/002;
F04D 29/263; F04D 17/08; F04D
25/0606; F04D 25/0646; F04D 29/053;
F04D 29/059; F04D 29/281; F04D
29/325; F04D 25/062; F04D 25/064;
F05B 2260/96; H02K 5/24; H02K 7/14;
H02K 9/06; H02K 1/30; H02K 5/10;
H02K 1/2786; H02K 21/22; H02K
5/1735; H02K 7/085; H02K 11/33; H02K
1/16; H02K 1/187; H02K 1/32; H02K
5/18; H02K 5/20; H02K 5/225; H02K
7/083; D06F 37/304; F04B 17/03; F16C
17/10; F16C 2360/46; F16C 2380/26;
F16C 33/723; F16C 33/74; Y10T
29/49009; Y10T 29/49012; Y10T
29/49169; Y10T 29/49696; Y10T
29/49826; Y10T 29/49947; Y10T 29/4998
USPC .................................................... 417/423.1
See application file for complete search history.

(56) References Cited

U.S. PATENT DOCUMENTS

| | | | | |
|---|---|---|---|---|
| 4,959,571 A * | 9/1990 | Yasumoto | ........... | F04D 25/0613 310/63 |
| 5,407,283 A * | 4/1995 | Ohtsuka | ........... | F16C 17/10 384/130 |
| 5,931,660 A * | 8/1999 | Amrhein | ........... | F04D 25/0613 417/353 |
| 5,944,497 A * | 8/1999 | Kershaw | ........... | F04D 25/082 417/368 |
| 5,962,938 A * | 10/1999 | Bobay | ........... | H02K 1/187 310/156.26 |
| 5,973,424 A * | 10/1999 | Engelberger | ........ | F04D 25/0646 264/272.2 |
| 5,986,379 A * | 11/1999 | Hollenbeck | ........... | H02K 1/145 310/216.038 |
| 6,023,117 A * | 2/2000 | Chen | ........... | F04D 25/0613 310/68 R |
| 6,158,985 A | 12/2000 | Watanabe et al. | | |
| 6,271,611 B1 | 8/2001 | Taniguchi et al. | | |
| 6,353,274 B1 * | 3/2002 | Ogawara | ........... | F04D 29/059 310/91 |
| 6,359,354 B1 * | 3/2002 | Watanabe | ........... | H02K 5/08 310/154.45 |
| 6,384,494 B1 * | 5/2002 | Avidano | ........... | H02K 9/06 310/58 |
| 6,488,485 B1 * | 12/2002 | Rupp | ........... | F04D 25/0613 415/119 |
| 6,511,303 B2 * | 1/2003 | Obara | ........... | F04D 25/0606 417/423.12 |
| 6,798,091 B2 * | 9/2004 | Kudou | ........... | H02K 5/08 310/43 |
| 6,916,160 B2 * | 7/2005 | Obara | ........... | F04D 25/08 417/354 |
| 6,979,177 B2 * | 12/2005 | Lin | ........... | F04D 25/0613 310/156.26 |
| 7,166,950 B2 * | 1/2007 | Kim | ........... | D06F 37/304 310/156.26 |
| 7,507,068 B2 * | 3/2009 | Lin | ........... | F04D 25/082 415/176 |
| 7,679,230 B2 * | 3/2010 | Yamada | ........... | H02K 3/522 310/180 |
| 8,678,785 B2 * | 3/2014 | Nogami | ........... | F04D 29/083 415/174.3 |
| 9,033,680 B2 * | 5/2015 | Kudo | ........... | F04D 17/16 417/354 |
| 9,249,788 B2 * | 2/2016 | Kimura | ........... | F04D 25/0613 |
| 9,685,840 B2 * | 6/2017 | Germann | ........... | H02K 7/085 |
| 9,869,321 B2 * | 1/2018 | Ishihara | ........... | H02K 5/16 |
| 10,094,386 B2 * | 10/2018 | Ziegler | ........... | F04D 25/0606 |
| 10,224,777 B2 * | 3/2019 | Murase | ........... | H02K 5/10 |
| 2006/0233643 A1 | 10/2006 | Lin et al. | | |
| 2007/0138902 A1 * | 6/2007 | Ahn | ........... | D06F 37/304 310/261.1 |
| 2007/0241643 A1 | 10/2007 | Watanabe et al. | | |
| 2008/0075596 A1 | 3/2008 | Kitamura | | |
| 2010/0299912 A1 | 12/2010 | Sahara et al. | | |
| 2010/0314954 A1 | 12/2010 | Araki et al. | | |
| 2011/0027075 A1 | 2/2011 | Nogami et al. | | |
| 2011/0074230 A1 * | 3/2011 | Hasegawa | ........... | F04D 29/023 310/43 |
| 2012/0183417 A1 * | 7/2012 | Linnenbrock | ......... | F04D 29/263 417/410.1 |
| 2013/0287605 A1 * | 10/2013 | Kimura | ........... | F04D 25/0613 417/410.1 |
| 2014/0294621 A1 * | 10/2014 | Narita | ........... | F04D 25/0613 417/354 |
| 2015/0311766 A1 * | 10/2015 | Matsuda | ........... | H02K 29/08 417/423.7 |
| 2015/0340916 A1 * | 11/2015 | Kang | ........... | F04D 17/08 310/156.12 |
| 2016/0138598 A1 * | 5/2016 | Park | ........... | F25D 17/067 62/419 |
| 2017/0133911 A1 * | 5/2017 | Takayama | ........... | H02K 9/06 |

FOREIGN PATENT DOCUMENTS

| | | | |
|---|---|---|---|
| JP | 62-89452 A | 4/1987 | |
| JP | 63-100968 U | 6/1988 | |
| JP | 63-253846 A | 10/1988 | |
| JP | 64-41696 A | 2/1989 | |
| JP | 64-41697 A | 2/1989 | |
| JP | 2006-46585 * | 2/2006 | ............. F16C 19/06 |
| JP | 2007-244175 A | 9/2007 | |

OTHER PUBLICATIONS

European Search Report of corresponding EP Application No. 16 85 5285.9 dated Apr. 1, 2019.
International Preliminary Report of corresponding PCT Application No. PCT/JP2016/079275 dated Apr. 26, 2018.

* cited by examiner

ELECTRIC MOTOR HAVING A STATOR WITH A RADIALLY OUTSIDE ROTOR WITH THE ROTOR HAVING A FAN MOUNTING PORTION COMPRISING A NONCONTACT REGION AND A CONTRACT REGION CONFIGURED TO CONTACT A MOUTING SURFACE OF A FAN

CROSS-REFERENCE TO RELATED APPLICATIONS

This U.S. National stage application claims priority under 35 U.S.C. § 119(a) to Japanese Patent Application No. 2015-203400, filed in Japan on Oct. 15, 2015, the entire contents of which are hereby incorporated herein by reference.

BACKGROUND OF THE INVENTION

Field of the Invention

The present invention relates to an electric motor and a blower.

Description of Related Art

A conventional electric motor is described in JP S63-253846. This electric motor includes a stator, a rotor, and a mounting portion that is located on axially one side of the stator and mounted to the rotor with a fan mounted thereto. The torque of the rotor generated by electromagnetic force is transmitted to the fan through the mounting portion to rotate the fan.

SUMMARY

In the conventional electric motor, the entire surface of a one-side end face of the fan mounting portion is in contact with a mounting surface of the fan. Consequently, vibrations caused by electromagnetic force are transmitted from the rotor to the fan, which results in generation of noise due to electromagnetic force.

It is therefore an object of the present invention to provide an electric motor capable of reducing noise caused by electromagnetic force.

In order to solve the problem, an electric motor according to the present invention comprises:
a stator;
a rotor having a tubular shape and disposed radially outside of the stator; and
a fan mounting portion located on one side of the stator in an axial direction and mounted to the rotor, wherein
an end face of the fan mounting portion has a contact region that contacts a mounting surface of a fan, and a noncontact region that does not contact the fan.

With this configuration, the end face of the fan mounting portion has the contact region that contacts the mounting surface of the fan and the noncontact region that does not contact the mounting surface of the fan. Thus, the contact area between the end face of the fan mounting portion and the mounting surface of the fan can be reduced, as compared with when the entire surface of the end face of the fan mounting portion contacts the mounting surface of the fan. Therefore, it is possible to suppress vibrations caused by electromagnetic force from being transmitted from the rotor to the fan to reduce noise caused by electromagnetic force.

In an electric motor according to one aspect,
the contact region is located radially inside of the rotor and also radially inside of the noncontact region.

According to this aspect, the contact region is located radially inside of the rotor and also radially inside of the noncontact region. Thus, the distance from the rotor to the contact region can be made larger than the distance in a case where the entire surface of the end face of the fan mounting portion contacts the mounting surface of the fan. Therefore, it is possible to suppress vibrations caused by electromagnetic force from being transmitted from the rotor to the fan to further reduce noise caused by electromagnetic force.

In an electric motor according to one aspect,
the contact region protrudes more in the axial direction than the noncontact region.

According to this aspect, since the contact region axially protrudes more than the noncontact region, the noncontact region can be securely provided on the side of the electric motor, and noise caused by electromagnetic force can be reliably reduced.

In an electric motor according to one aspect,
the contact region is made of a metal material.

According to this aspect, since the contact region is made of a metal material, the surface accuracy of the contact region can be improved, as compared with when the contact region is made of a resin material, for example. Thus, the degree of close contact between the end face of the fan mounting portion and the mounting surface of the fan can be improved, chatter vibrations generated between the end face of the fan mounting portion and the mounting surface of the fan can be suppressed, and noise can be further reduced.

A blower according to one aspect further comprises:
the electric motor; and
a fan mounted to the fan mounting portion of the electric motor.

According to this aspect, since the blower can suppress vibrations transmitted from the electric motor to the fan, noise caused by electromagnetic force can be reduced.

In a blower according to one aspect,
the fan mounting portion of the electric motor has a projection protruding from the end face in the axial direction,
the fan has a through hole passing through the fan in the axial direction, and
the projection is inserted into the through hole with a space between the projection and an inner peripheral surface of the through hole.

According to this aspect, the projections are inserted into the through holes with a space between the projections and the inner peripheral surfaces of the through holes, and thus do not contact the fan. Therefore, it is possible to prevent vibrations caused by electromagnetic force from being transmitted from the projections to the fan to prevent generation of noise due to electromagnetic force.

Advantageous Effects of Invention

According to the present invention, since the end face of the fan mounting portion has the noncontact region that does not contact the mounting surface of the fan, noise caused by electromagnetic force can be reduced.

DETAILED DESCRIPTION OF EMBODIMENT(S)

Hereinafter, the present invention will be described in detail with reference to an illustrated embodiment.

Figure 1:
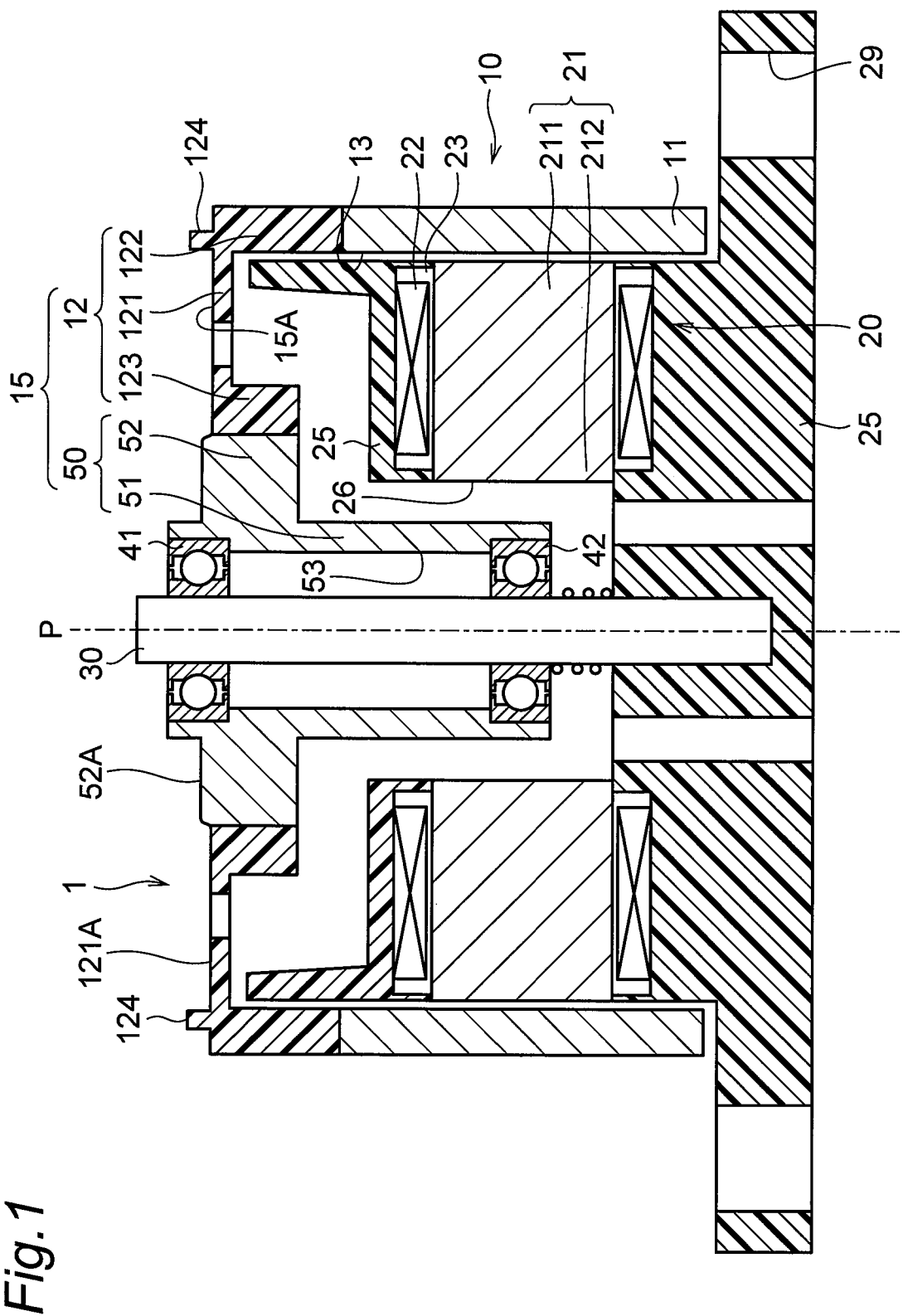
FIG. 1 is a cross-sectional view showing a schematic configuration of an electric motor of the present invention.

FIG. 1 is a cross-sectional view in a cross section including an imaginary rotation axis P, showing a schematic configuration of an electric motor 1 of the present invention.

The electric motor 1 includes a rotor 10, a stator 20, a shaft 30, and a plurality of bearings 41 and 42.

The shaft 30 is a rod-shaped (for example, cylindrical) member extending along the rotation axis P, and has conductivity. The shaft 30 is formed of, for example, metal (such as stainless steel).

In the following description, a direction along the rotation axis P is referred to as an axial direction, and a circumferential direction and a radial direction with respect to the rotation axis P are simply referred to as a circumferential direction and a radial direction, respectively.

The stator 20 includes a stator core 21 and windings 22. The stator core 21 is formed of a soft magnetic material, and has conductivity. The stator core 21 has a plurality of teeth 211 and a back yoke 212.

Figure 2:
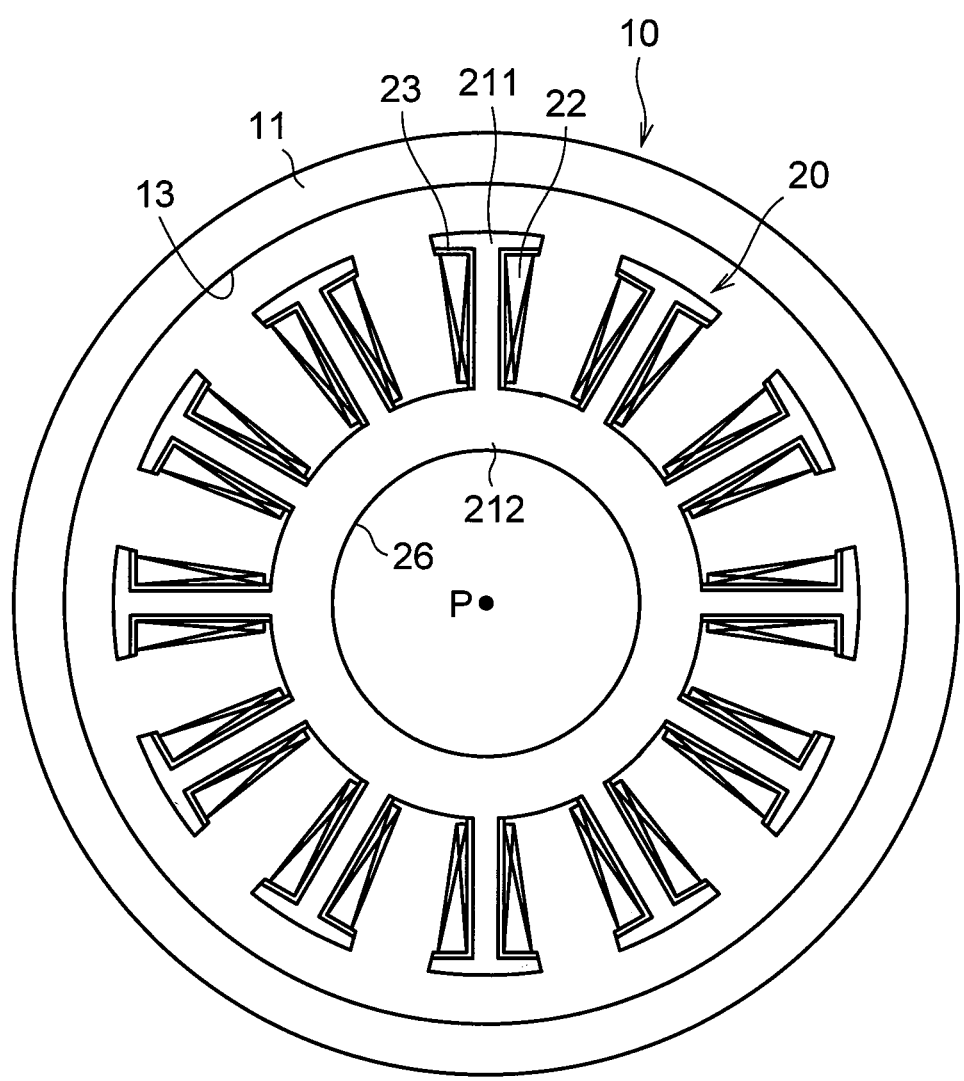
FIG. 2 is a cross-sectional view showing a schematic configuration of a stator and a rotor of the electric motor.

FIG. 2 is a cross-sectional view showing an example of a schematic configuration of the stator 20 and the rotor 10. FIG. 2 shows a cross section perpendicular to the rotation axis P, a cross section passing through the teeth 211.

The teeth 211 are arranged around the shaft 30 (rotation axis P). More specifically, the teeth 211 are spaced side by side along the circumferential direction, and arranged radially around the rotation axis P.

The back yoke 212 magnetically connects one ends (one ends on the inner peripheral side in FIG. 1) of the teeth 211 to one another. The back yoke 212 has, for example, a tubular (substantially cylindrical) shape with respect to the rotation axis P.

The stator core 21 may be formed by a plurality of laminated steel plates that are laminated along the axial direction, for example. This can reduce eddy currents generated in the stator core 21. The stator core 21 does not necessarily need to be constituted by laminated steel plates, and may be a dust core formed with resin contained therein, for example. This also reduces eddy currents.

Each winding 22 is wound around the corresponding tooth 211 via an insulator 23, for example. The winding 22 is wound around the tooth 211 with an axis along the radial direction as a winding axis. The insulator 23 is formed of an insulating material, and insulates the winding 22 from the tooth 211. In the present description, unless otherwise specified, a winding does not refer to individual wires constituting a winding, but refers to wires wound into a single group. This also applies to the drawings. Leader lines at the beginning of winding and the end of winding, and their connections are omitted as appropriate in the drawings.

The rotor 10 is disposed radially outside of the stator 20, and has a substantially cylindrical shape with respect to the rotation axis P. The rotor 10 has a magnetic pole member 11.

The magnetic pole member 11 is a member for supplying a field magnetic flux to the stator 20, and faces the stator 20 via an air gap.

As shown in FIG. 1, the magnetic pole member 11 is provided radially outside of the stator 20 (i.e on the side opposite from the shaft 30). In other words, the rotor 10 is provided in a position away from the shaft 30 with respect to the stator 20. The electric motor 1 is a so-called outer-rotor motor.

The magnetic pole member 11 is formed by, for example, a permanent magnet, and has magnetic pole surfaces of circumferentially alternately different polarities toward the stator 20. The magnetic pole member 11 is, for example, a bonded magnet. The magnetic pole member 11 is formed with a hole 13 passing therethrough, and the stator 20 is disposed inside of the hole 13. As magnet piece in the bonded magnet, a ferrite magnet, for example, can be used.

In the rotor 10 and the stator 20, an appropriate application of AC voltage to the winding 22 allows the stator 20 to supply a rotating magnetic field to the rotor 10. Accordingly, the rotor 10 rotates with respect to the stator 20.

The stator 20 is fixed to the shaft 30 by a stator fixing portion 25. That is, the stator fixing portion 25 is fixed to the stator 20, and is fixed also to the shaft 30. For example, the stator fixing portion 25 is formed of resin, and is formed integrally with the stator 20 and the shaft 30.

The stator fixing portion 25 covers the stator 20 in a close contact manner at both sides of the stator 20 in the axial direction, for example. If there is an air gap between the individual portions of the winding 22 in the circumferential direction, the stator fixing portion 25 may fill the air gap. The number of windings (the number of layers) of the winding 22 may be increased to narrow the air gap between the individual portions of the winding 22. This can improve the ratio of the volume occupied by the winding 22 to an air gap between the teeth 211 (space factor), and thereby improving an efficiency of the electric motor 1.

Since the stator fixing portion 25 covers the stator 20, the stator 20 can be protected. A surface of the stator 20 facing the rotor 10 (outer peripheral surfaces of the teeth 211) is not covered by the stator fixing portion 25, but is exposed. This is to reduce magnetic resistance between the stator 20 and the rotor 10. Thus, the efficiency of the electric motor 1 can be improved. Although the stator fixing portion 25 does not cover an inner peripheral surface 26 of the back yoke 212, the stator fixing portion 25 may alternatively cover the inner peripheral surface 26. The inner peripheral surface 26 of the back yoke 212 can therefore be protected as well.

The inner peripheral surface 26 of the back yoke 212 forms a hole. The hole opens to axially one side (hereinafter referred to as the upper side), but is covered partially at the axially other side (hereinafter referred to as the lower side) by the stator fixing portion 25. The shaft 30 axially passes through the hole, and one end of the shaft 30 is embedded in and fixed to the stator fixing portion 25 on a bottom surface of the hole (a surface formed by the stator fixing portion 25).

As described above, the stator fixing portion 25 fixes the stator 20 and the shaft 30, and thus functions also as a connecting portion connecting the stator 20 and the shaft 30.

The rotor 10 is rotatably mounted to the shaft 30 by a fan mounting portion 15 and the bearings 41 and 42. The bearings 41 and 42 are mounted on the shaft 30.

The bearings 41 and 42 are fixed to the shaft 30 in a state of being externally fitted onto the shaft 30. The bearings 41 and 42 are axially spaced and mounted on the shaft 30. Although the two bearings 41 and 42 are provided, only one bearing may alternatively be provided, or three or more bearings may alternatively be provided.

The fan mounting portion 15 is located on the axially upper side of the stator 20, and faces the stator 20 and the stator fixing portion 25 with a space therebetween. The fan mounting portion 15 is mounted to the rotor 10, and is also rotatably mounted to the shaft 30 via the bearings 41 and 42. An upper-side end face 15A of the fan mounting portion 15 has a contact region 52A that contacts a mounting surface of a fan 60 (shown in FIG. 3) described later, and a noncontact region 121A that does not contact the fan 60. The fan mounting portion 15 has a bearing housing 50 and a connecting portion 12.

The bearing housing 50 is, for example, a conductive member, and is formed of, for example, metal (such as aluminum). The bearing housing 50 has a tubular portion 51 and a flange 52 extending radially outward from an upper-side portion of the tubular portion 51. An upper-side end face of the flange 52 comes into contact with the mounting surface of the fan 60, and forms the contact region 52A.

The tubular portion 51 surrounds the shaft 30 with a space therebetween. The bearings 41 and 42 are fitted into an inner peripheral surface of the tubular portion 51.

The connecting portion 12 connects the bearing housing 50 and the rotor 10. The connecting portion 12 is formed of resin, for example. The connecting portion 12 has an inner tubular portion 123, a top face portion 121, projections 124, and an outer tubular portion 122.

The inner tubular portion 123 of the connecting portion 12 has a tubular shape. The inner tubular portion 123 is fixed to the bearing housing 50 at an outer peripheral edge portion of the flange 52 of the bearing housing 50.

The top face portion 121 of the connecting portion 12 has a plate ring shape. The top face portion 121 extends radially outward from a top end of the inner tubular portion 123. An upper-side end face of the top face portion 121 faces the mounting surface of the fan with a space therebetween, and forms the noncontact region 121A. The contact region 52A is located radially inside of the rotor 10 and also radially inside of the noncontact region 121A. The contact region 52A axially protrudes more than the noncontact region 121A.

The projections 124 of the connecting portion 12 each have a substantially cylindrical shape. The projections 124 protrude axially upward from the noncontact region 121A. The two projections 124 are provided on an outer edge portion of the top face portion 121. The projections 124 are located symmetrically with respect to the rotation axis P.

The outer tubular portion 122 of the connecting portion 12 has a tubular shape. The outer tubular portion 122 protrudes axially downward from an outer peripheral edge portion of the top face portion 121. The outer tubular portion 122 is fixed to the rotor 10 (magnetic pole member 11).

In the electric motor 1, the application of AC voltage to the winding 22 allows the stator 20 to supply a rotating magnetic field to the rotor 10. The rotor 10 accordingly rotates with respect to the stator 20.

Figure 3:
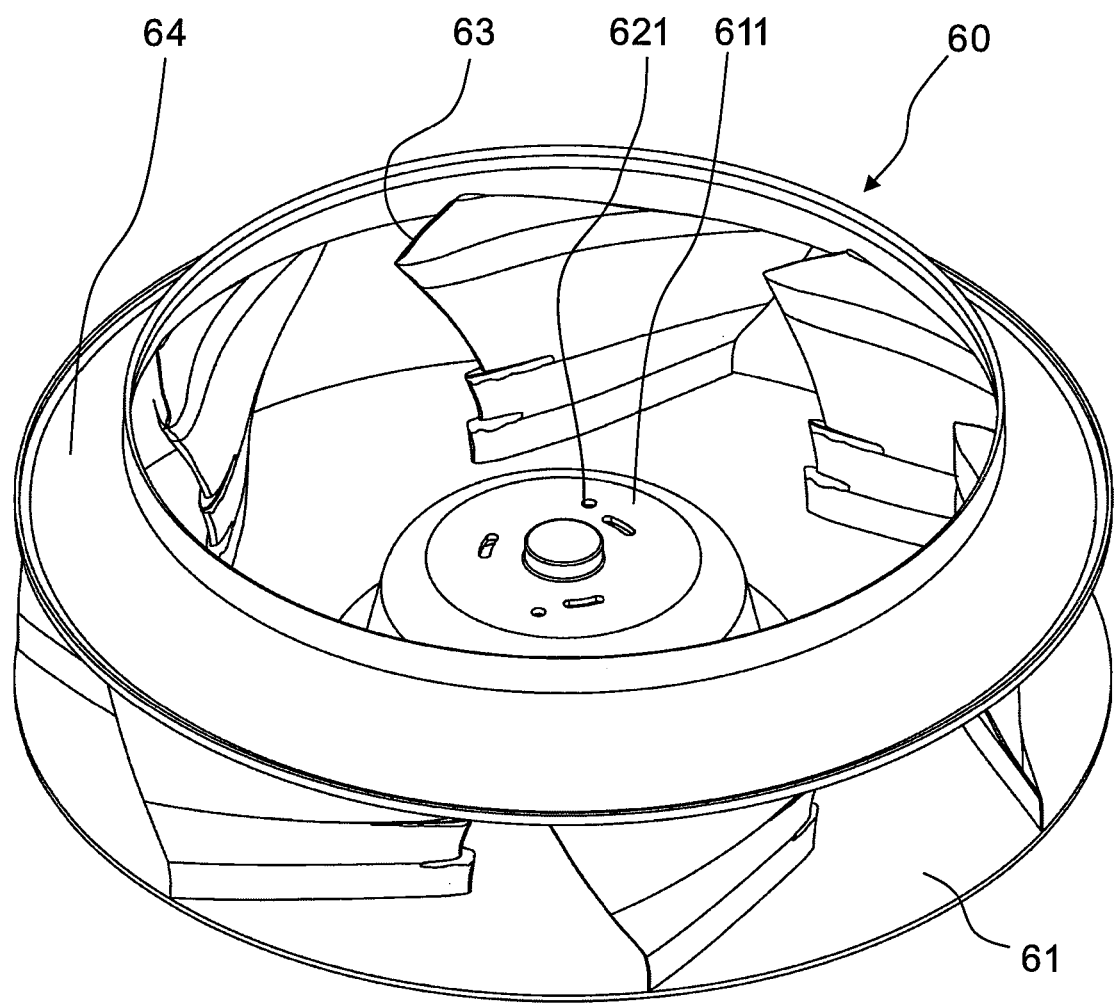
FIG. 3 is an exploded perspective view of a blower of the present invention.
Figure 4:
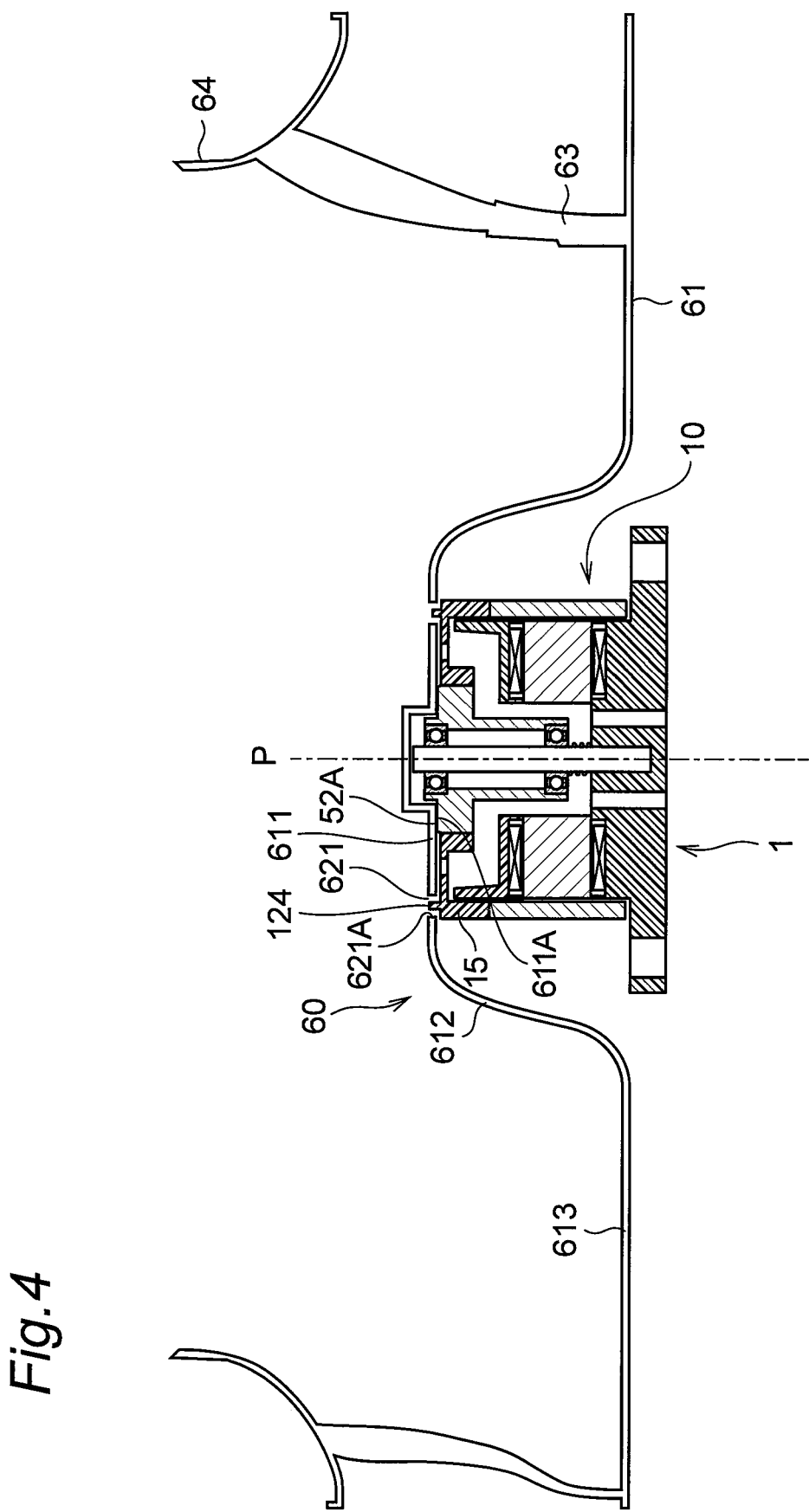
FIG. 4 is a cross-sectional view showing a schematic configuration of the blower.

The electric motor 1 drives a fan. FIG. 3 is an exploded perspective view of a blower including the electric motor 1 and the fan 60. FIG. 4 is a cross-sectional view in across section including the imaginary rotation axis P, showing a schematic configuration of the blower.

As shown in FIGS. 3 and 4, the fan 60 includes a mounting plate 61, a plurality of blades 63, and an upper plate 64. The fan 60 is mounted to the fan mounting portion 15 of the electric motor 1, and rotates as the rotor 10 rotates. The fan 60 is a centrifugal fan, and as a more specific example, is a turbo fan.

The mounting plate 61 has a plate shape with a raised central portion. The mounting plate 61 has a substantially circular shape when viewed along the axial direction. The mounting plate 61 includes a central portion 611 mounted to the fan mounting portion 15 of the electric motor 1, a tubular portion 612 extending substantially axially from an outer peripheral end of the central portion 611 so as to surround the electric motor 1, and a flange 613 extending radially outward from an end of the tubular portion 612 opposite to the central portion 611.

The central portion 611 has two through holes 621 axially passing therethrough in a radially outer portion thereof. When the fan 60 is mounted to the electric motor 1, the projections 124 of the electric motor 1 are inserted into the through holes 621. Thus, the projections 124 can be used as guides for mounting the fan 60 to the electric motor 1. When the fan 60 is mounted to the electric motor 1, the projections 124 are located in the through holes 621 with a space between the projections 124 and inner peripheral surfaces 621A of the through holes 621.

An end face of the central portion 611 on the side of the tubular portion 612 forms amounting surface 611A of the fan 60. The mounting surface 611A comes into contact with the contact region 52A.

The blades 63 are spaced side by side around the rotation axis P, and fixed to the mounting plate 61. The blades 63 are mounted radially outside of the electric motor 1.

The upper plate 64 is fixed to the blades 63 at the side opposite from the mounting plate 61. The upper plate 64 has a ring shape with respect to the rotation axis P as viewed along the rotation axis P.

In this blower, as the electric motor 1 and the fan 60 rotate, the fan 60 draws air mainly from above through an opening of the upper plate 64, and blows out air radially outward.

Figure 5:
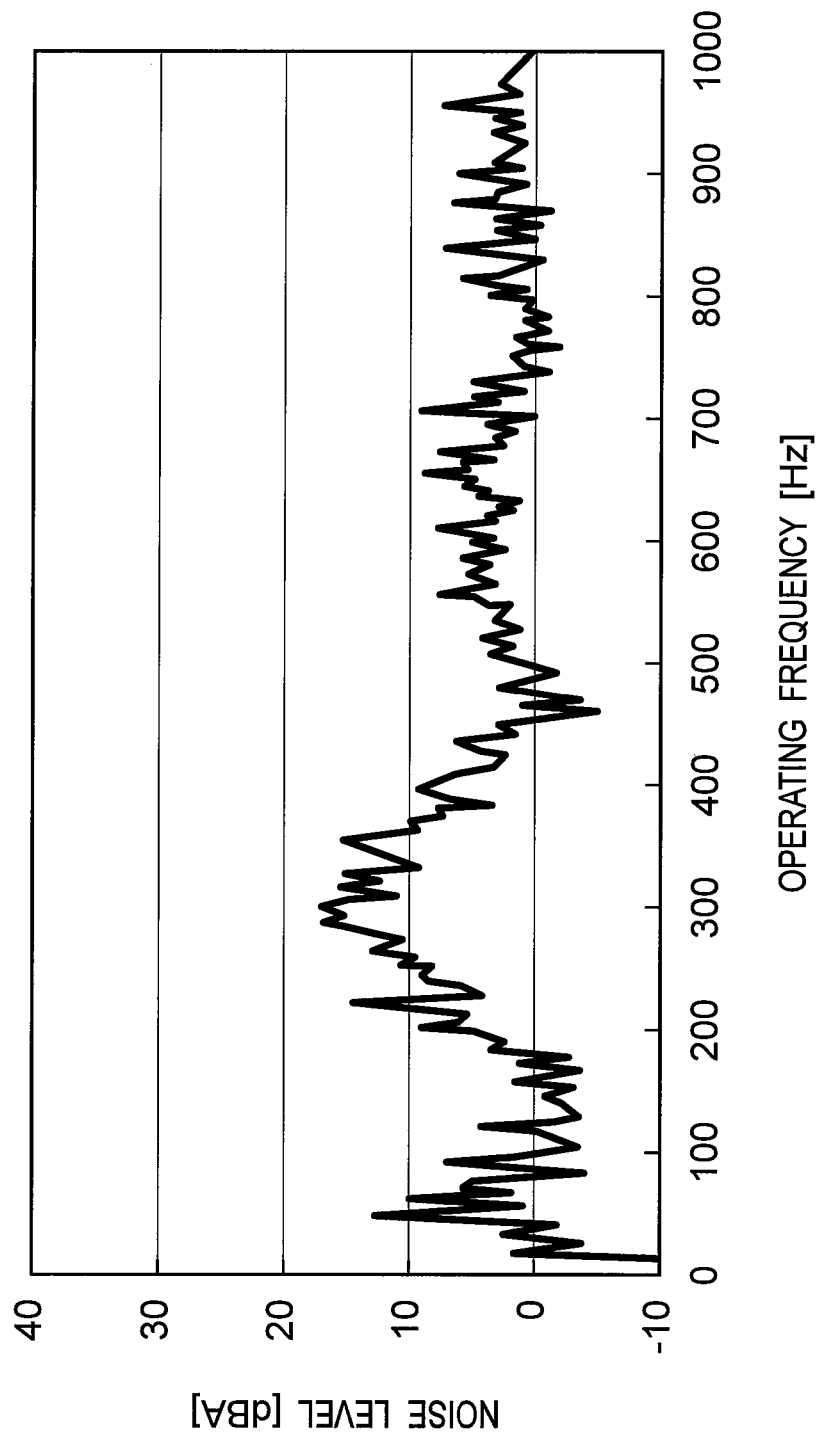
FIG. 5 is a graph showing a relationship between an operating frequency and a noise level of the blower.
Figure 6:
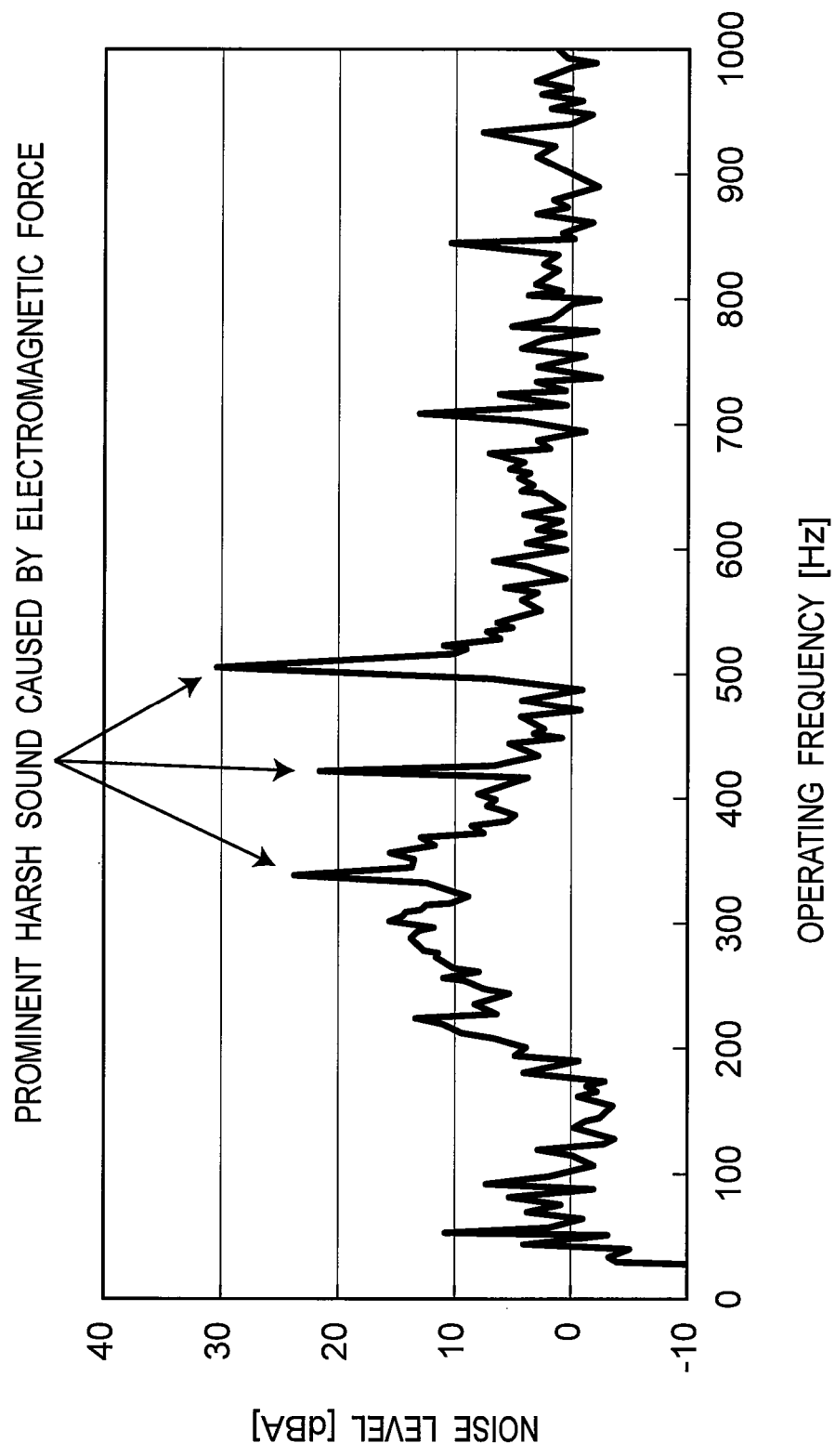
FIG. 6 is a graph showing a relationship between an operating frequency and a noise level of a blower in a comparative example.

FIG. 5 is a graph showing a relationship between an operating frequency and a noise level of the blower of the present invention. FIG. 6 is a graph showing a relationship between an operating frequency and a noise level of a blower in a comparative example. In FIGS. 5 and 6, the horizontal axis represents the operating frequency [Hz], and the vertical axis represents the noise level [dBA]. Here, the blower in the comparative example differs from the blower of the present invention only in that the entire surface of the mounting surface of the electric motor is in contact with the mounting surface of the fan. The operating frequency of the blower is the rotational frequency of the fan of the blower.

As shown in FIG. 6, in the blower in the comparative example, when the operating frequency is about 330 Hz, about 410 Hz, and about 500 Hz, the level of noise caused by electromagnetic force is prominently higher. By contrast, as shown in FIG. 5, in the blower of the present invention, when the operating frequency is about 330 Hz, about 410 Hz, and about 500 Hz, the level of noise caused by electromagnetic force is not prominently higher, and the noise level can be reduced.

According to the electric motor 1 having the above configuration, the end face 15A of the fan mounting portion 15 has the contact region 52A that contacts the mounting surface 611A of the fan 60 and the noncontact region 121A that does not contact the mounting surface 611A of the fan 60. Thus, the contact area between the end face 15A of the fan mounting portion 15 and the mounting surface 611A of the fan 60 can be reduced, as compared with when the entire surface of the end face 15A of the fan mounting portion 15 contacts the mounting surface 611A of the fan 60. Therefore, it is possible to suppress vibrations caused by electromagnetic force from being transmitted from the rotor 10 to the fan 60 to reduce noise caused by electromagnetic force.

The contact region 52A is located radially inside of the rotor 10 and also radially inside of the noncontact region 121A. Thus, the distance from the rotor 10 to the contact region 52A can be made larger than the distance in a case where the entire surface of the end face 15A of the fan mounting portion 15 contacts the mounting surface 611A of the fan 60. Therefore, it is possible to suppress vibrations caused by electromagnetic force from being transmitted from the rotor 10 to the fan 60 to further reduce noise caused by electromagnetic force.

Since the contact region 52A axially protrudes more than the noncontact region 121A, the noncontact region 121A can be securely provided on the side of the electric motor 1, and noise caused by electromagnetic force can be reliably reduced.

Since the contact region 52A is made of a metal material, the surface accuracy of the contact region 52A can be improved, as compared with when the contact region 52A is made of a resin material, for example. Thus, the degree of close contact between the end face 15A of the fan mounting portion 15 and the mounting surface 611A of the fan 60 can be improved, chatter vibrations generated between the end face 15A of the fan mounting portion 15 and the mounting surface 611A of the fan 60 can be suppressed, and noise can be further reduced.

Since the blower can suppress vibrations transmitted from the electric motor 1 to the fan 60, noise caused by electromagnetic force can be reduced.

The projections 124 are inserted into the through holes 621 with a space between the projections 124 and the inner peripheral surfaces 621A of the through holes 621, and thus do not contact the fan 60. Therefore, it is possible to prevent vibrations caused by electromagnetic force from being transmitted from the projections 124 to the fan 60. As a result, generation of noise due to electromagnetic force is prevented.

In the above embodiment, the contact region 52A is located radially inside of the rotor 10 and also radially inside of the noncontact region 121A, but is not limited to this. For example, the contact region may be located radially outside of the noncontact region.

In the above embodiment, the contact region 52A axially protrudes more than the noncontact region 121A, but is not limited to this. For example, the mounting surface of the electric motor may be a flat surface, while the mounting surface of the fan may be provided with unevenness so that the mounting surface of the fan has a contact region and a noncontact region.

In the above embodiment, the contact region 52A is made of a metal material, but is not limited to this, and may be made of another material such as a resin material.

In the above embodiment, the fan mounting portion 15 has the two projections 124, but is not limited this, and may have only one projection or three or more projections. Alternatively, the mounting portion may not have projections.

Although the specific embodiment of the present invention has been described, the present invention is not limited to the above embodiment, and various modifications can be made within the scope of the present invention.

What is claimed is:

1. An electric motor comprising:
a stator;
a rotor having a tubular shape and disposed radially outside of the stator; and
a fan mounting portion located on one side of the stator along an axial direction and mounted to the rotor, the fan mounting portion defining an end face of the electric motor that faces away from the stator in the axial direction,
the end face of the fan mounting portion having
a contact region configured to contact a mounting surface of a fan, and
a noncontact region that does not contact the fan,
the noncontact region being positioned between the rotor and the contact region and the noncontact region extending to an outermost portion of the end face in the radial direction,
the contact region being made of a metal material and the noncontact region is made of a resin material.

2. The electric motor according to claim 1, wherein the contact region is located radially inside of the rotor and radially inside of the noncontact region.

3. The electric motor according to claim 1, wherein the contact region protrudes more along the axial direction than the noncontact region.

4. A blower including the electric motor according to claim 1, the blower further comprising:
the fan mounted to the fan mounting portion of the electric motor.

5. The blower according to claim 4, wherein
the fan mounting portion of the electric motor has a projection protruding from the end face along the axial direction,
the fan has a through hole passing through the fan along the axial direction, and
the projection is inserted into the through hole with a space between the projection and an inner peripheral surface of the through hole.

6. The electric motor according to claim 2, wherein the contact region protrudes more along the axial direction than the noncontact region.

7. A blower including the electric motor according to claim 6, the blower further comprising:
the fan mounted to the fan mounting portion of the electric motor.

8. A blower including the electric motor according to claim 2, the blower further comprising:
the fan mounted to the fan mounting portion of the electric motor.

9. A blower including the electric motor according to claim 3, the blower further comprising:
the fan mounted to the fan mounting portion of the electric motor.

10. An electric motor comprising:
a stator;
a rotor having a tubular shape and disposed radially outside of the stator; and
a fan mounting portion located on one side of the stator along an axial direction and mounted to the rotor,
the fan mounting portion having
a bearing housing located radially inside the rotor, the bearing housing having an end face that faces away from the rotor in the axial direction, the end face forming a contact region configured to contact a mounting surface of a fan, a connecting portion located radially inside the rotor and radially outside the bearing housing, the connecting portion connecting the bearing housing to the rotor, and the connecting portion being configured and arranged such that no portion of the connecting portion contacts the fan when the fan is mounted on the fan mounting portion.

11. The electric motor according to claim 10, wherein the contact region protrudes farther from the stator in the axial direction than an end face of the connecting portion, the end face of the connecting portion defining a non-contact region.

12. The electric motor according to claim 10, wherein the bearing housing is made a metal material, and the connecting portion is made of a resin material, the connecting portion including an inner tubular portion that is fixed to an outer peripheral edge of the bearing housing.

13. The electric motor according to claim 10, further comprising:
a shaft arranged to pass through the bearing housing, one end of the shaft being fixed to the stator.

14. The electric motor according to claim 1, wherein the noncontact region extends to a position corresponding to the rotor in the radial direction.

15. The electric motor according to claim 1, wherein at least one projection extends from the noncontact region along the axial direction, the at least one projection being arranged and configured to fit into at least one through hole provided in the fan.

* * * * *